United States Patent
Abu-Mostafa et al.

(10) Patent No.: US 10,535,014 B2
(45) Date of Patent: Jan. 14, 2020

(54) ALTERNATIVE TRAINING DISTRIBUTION DATA IN MACHINE LEARNING

(71) Applicant: CALIFORNIA INSTITUTE OF TECHNOLOGY, Pasadena, CA (US)

(72) Inventors: Yaser Said Abu-Mostafa, Pasadena, CA (US); Carlos Roberto Gonzalez, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 446 days.

(21) Appl. No.: 14/451,935

(22) Filed: Aug. 5, 2014

(65) Prior Publication Data
US 2015/0254573 A1 Sep. 10, 2015

Related U.S. Application Data

(60) Provisional application No. 62/015,218, filed on Jun. 20, 2014, provisional application No. 61/950,358, filed on Mar. 10, 2014.

(51) Int. Cl.
G06N 20/00 (2019.01)
G06N 5/00 (2006.01)
G06K 9/62 (2006.01)

(52) U.S. Cl.
CPC .......... *G06N 20/00* (2019.01); *G06K 9/6256* (2013.01); *G06N 5/003* (2013.01)

(58) Field of Classification Search
None
See application file for complete search history.

(56) References Cited

U.S. PATENT DOCUMENTS 5,819,247 A 10/1998 Freund et al.
6,119,083 A 9/2000 Hollier et al.
(Continued)

FOREIGN PATENT DOCUMENTS

EP 1082646 B1 8/2011
EP 2296105 B1 10/2012
(Continued)

OTHER PUBLICATIONS

Bylander, T. et al., "Using Validation Sets to Avoid Overfitting in AdaBoost," Proc. of the 19th Intl. Florida AI Research Society Conf., (2006) pp. 544-549.*
(Continued)

*Primary Examiner* — Kakali Chaki
*Assistant Examiner* — Brian M Smith
(74) *Attorney, Agent, or Firm* — KPPB LLP

(57) ABSTRACT

Technologies are generally described for methods and systems in a machine learning environment. In some examples, a method may include retrieving training data from a memory. The training data may include training inputs and training labels. The methods may further include determining a set of datasets based on the training inputs. The methods may further include determining a set of out of sample errors based on the training inputs and based on test data. Each out of sample error may correspond to a respective dataset in the set of datasets. The methods may further include generating alternative distribution data based on the set of out of sample errors. The alternative distribution data may be used to determine weights to be applied to the training data.

21 Claims, 5 Drawing Sheets

(56) References Cited

U.S. PATENT DOCUMENTS

| | | | |
|---|---|---|---|
| 6,373,483 | B1 | 4/2002 | Becker et al. |
| 6,453,307 | B1 | 9/2002 | Schapire et al. |
| 6,594,586 | B1 | 7/2003 | Song et al. |
| 6,789,069 | B1 | 9/2004 | Barnhill et al. |
| 6,850,873 | B1 | 2/2005 | Bax |
| 6,876,955 | B1 | 4/2005 | Fleming et al. |
| 7,275,018 | B2 | 9/2007 | Abu-El-Zeet et al. |
| 7,379,568 | B2 | 5/2008 | Movellan et al. |
| 7,426,497 | B2 | 9/2008 | Baccioiu et al. |
| 7,561,158 | B2 | 7/2009 | Abe et al. |
| 7,617,164 | B2 | 11/2009 | Burges et al. |
| 7,689,520 | B2 | 3/2010 | Burges et al. |
| 7,720,830 | B2 | 5/2010 | Wen et al. |
| 8,175,384 | B1 | 5/2012 | Wang |
| 8,386,401 | B2 | 2/2013 | Virkar et al. |
| 8,788,439 | B2 | 7/2014 | Martinez et al. |
| 8,798,984 | B2 | 8/2014 | Cancedda et al. |
| 2002/0107842 | A1 | 8/2002 | Biebesheimer et al. |
| 2005/0071301 | A1 | 3/2005 | Kuroiwa |
| 2005/0216426 | A1 | 9/2005 | Weston et al. |
| 2005/0228783 | A1 | 10/2005 | Shanahan |
| 2006/0143254 | A1 | 6/2006 | Chen |
| 2006/0248049 | A1 | 11/2006 | Cao et al. |
| 2007/0094171 | A1 | 4/2007 | Burges |
| 2007/0203908 | A1 | 8/2007 | Wang et al. |
| 2007/0203940 | A1 | 8/2007 | Wang et al. |
| 2007/0223808 | A1 | 9/2007 | Kerr |
| 2008/0169975 | A1 | 7/2008 | Yee |
| 2009/0091443 | A1 | 4/2009 | Chen |
| 2009/0132515 | A1 | 5/2009 | Lu et al. |
| 2010/0169243 | A1 | 7/2010 | Su et al. |
| 2010/0287125 | A1 | 11/2010 | Okubo |
| 2011/0011921 | A1 | 5/2011 | Elisseeff et al. |
| 2012/0078825 | A1 | 3/2012 | Kulkarni et al. |
| 2012/0223889 | A1 | 9/2012 | Medlock et al. |
| 2012/0271821 | A1 | 10/2012 | Qin et al. |
| 2012/0290316 | A1 | 11/2012 | Tidhar |
| 2012/0290319 | A1 | 11/2012 | Saria et al. |
| 2012/0330971 | A1 | 12/2012 | Thomas et al. |
| 2013/0066452 | A1 | 3/2013 | Kobayashi et al. |
| 2013/0097103 | A1* | 4/2013 | Chari .................. G06N 99/005 706/12 |
| 2013/0118736 | A1 | 5/2013 | Usadi |
| 2013/0238533 | A1 | 9/2013 | Virkar |
| 2013/0254153 | A1 | 9/2013 | Marcheret |
| 2014/0079297 | A1 | 3/2014 | Tadayon et al. |
| 2014/0180738 | A1 | 6/2014 | Phillipps et al. |
| 2014/0180980 | A1 | 6/2014 | Hido et al. |
| 2014/0195466 | A1 | 7/2014 | Phillipps et al. |
| 2014/0201126 | A1 | 12/2014 | Zadeh et al. |
| 2015/0019463 | A1* | 1/2015 | Simard ............... G06F 17/2785 706/12 |
| 2015/0100530 | A1 | 4/2015 | Mnih et al. |
| 2015/0206065 | A1 | 7/2015 | Abu-Mostafa et al. |
| 2015/0206066 | A1 | 7/2015 | Abu-Mostafa et al. |
| 2015/0206067 | A1 | 7/2015 | Abu-Mostafa et al. |
| 2015/0254573 | A1 | 9/2015 | Abu-Mostafa et al. |
| 2016/0379140 | A1 | 12/2016 | Abu-Mostafa et al. |
| 2017/0011307 | A1 | 1/2017 | Abu-Mostafa et al. |

FOREIGN PATENT DOCUMENTS

| | | |
|---|---|---|
| EP | 3117338 A1 | 1/2017 |
| JP | 2005044330 A | 2/2005 |
| JP | 2010092266 A | 4/2010 |
| KR | 20160127100 A | 11/2016 |
| WO | 03040949 A1 | 5/2003 |
| WO | 2014151351 A1 | 9/2014 |
| WO | 2015077555 A2 | 5/2015 |
| WO | 2015077557 A1 | 5/2015 |
| WO | 2015077564 A2 | 5/2015 |
| WO | 2015138082 A1 | 9/2015 |

OTHER PUBLICATIONS

Babenko, B., "Note: A Derivation of Discrete AdaBoost", dowloaded from https://web.archive.org/web/20110717111635/http://vision.ucsd.edu/~bbabenko/data/boosting_note.pdf thus available Jul. 17, 2011, 3 pp.*

Kalai, A.T. et al., "Boosting in the presence of noise" Proc. 35th Annual ACM Symp. on Theory of Computing (2003) pp. 195-205.*

Sugiyama, M., "Active learning in approximately linear regression based on conditional expectation of generalization error," Journal of Machine Learning Research (2006) pp. 141-166.*

Johns, M.V., "Importance Sampling for Bootstrap Confidence Interval," Journal of the American Statistical Association, vol. 83, No. 403 (Sep. 1988) pp. 709-714.*

"Machine learning," accessed at https://web.archive.org/web/20141117095534/http://en.wikipedia.org/wiki/Machine_learning, last modified on Nov. 16, 2014, pp. 13.

International Search Report and Written Opinion for application PCT/US2014/066805, dated Feb. 19, 2015, 10 pages.

International Search Report and Written Opinion for application PCT/US2014/066808, dated Feb. 24, 2015, 15 pages.

International Search Report & Written Opinion for International application with application No. PCT/US15/15669, dated Jun. 3, 2015, 15 pages.

"AdaBoost", AdaBoost—Wikipedia, the free encyclopedia, accessed at http://en.wikipedia.org/wiki/AdaBoost, Last modified on Mar. 26, 2014, 8 Pages.

"Machine learning: Boosting," accessed at http://math.bu.edu/people/mkon/MA751/L17Boosting.pdf, accessed on Jun. 16, 2014, pp. 41.

Bickel, S., et al., "Discriminative Learning under covariate shift," The Journal of Machine Learning Research, 2009, pp. 2137-2155, vol. 10.

Bickel, S., et al., "Discriminative Learning for Differing Training and Test Distributions," In Proceedings of the 24th international conference on Machine learning, 2007, pp. 81-88.

Cao, B., et al., "Distance Metric Learning under Covariate Shift," Proceedings of the Twenty-Second International Joint Conference on Artificial Intelligence, 2011, pp. 1204-1210.

Chen, T., et al., "Feature-Based Matrix Factorization," 2011, pp. 10.

Cortes, C., et al., "Sample Selection Bias Correction Theory," In Algorithmic Learning Theory, 2008, pp. 38-53.

Cortes, C., et al., "Learning Bounds for Importance Weighting," Advances in Neural Information Processing Systems, 2010, pp. 442-450.

Hanczar, B. and Dougherty, E., "The reliability of estimated confidence intervals for classification error rates when only a single sample is available," Pattern Recognition , 2013, pp. 1067-1077, vol. 46.

Huang, J., et al., "Correcting Sample Selection Bias by Unlabeled Data," Proceedings of the 2006 Conference Advances in Neural Information processing systems, 2007, pp. 601-608, vol. 19.

Kohavi, R., et al., "The Utility of Feature Weighting in Nearest-Neighbor Algorithms," Proceedings of the Ninth European Conference on Machine Learning, 1997, pp. 10.

Koren, Y., "Factorization meets the neighborhood: a multifaceted collaborative filtering model," In Proceedings of the 14th ACM SIGKDD international conference on Knowledge discovery and data mining, 2008, pp. 426-434, ACM.

Rajan, S., "A Large-Scale Active Learning System for Topical Categorization on the Web," Proceedings of the 19th international conference on World wide web, 2010, pp. 791-800.

Ren, J., et al., "Type Independent Correction of Sample Selection Bias via Structural Discovery and Re-balancing," In Proceedings of the Eighth SIAM International Conference on Data Mining, 2008, pp. 565-576.

Rosset, S., et al., "A Method for Inferring Label Sampling Mechanisms in Semi-Supervised Learning," Advances in Neural Information Processing Systems 17, 2005, pp. 8.

Shimodaira, H., "Improving predictive inference under covariate shift by weighting the log-likelihood function," Journal of Statistical Planning and Inference, 200, pp. 227-244, vol. 90.

Sugiyama, M., "Direct Importance Estimation with Model Selection and Its Application to Covariate Shift Adaptation," Advances in neural information processing systems, 2008, pp. 1433-1440.

(56) References Cited

OTHER PUBLICATIONS

Tsianos, K. I., et al., "Push-Sum Distributed Dual Averaging for Convex Optimization," In proceeding of IEEE Conference on Decision and Control, 2012, pp. 5453-5458.
Zadrozny, B., "Learning and Evaluating Classifiers under Sample Selection Bias," In Proceedings of the 21st international conference on Machine learning, 2004, pp. 1-8.
Zadrozny, B., et al., "Cost-Sensitive Learning by Cost-Proportionate Example Weighting," Proceedings of the Third IEEE International Conference on Data Mining, 2003, pp. 435-442.
Extended european search Search Report for Appliaction No. 16172168.3, dated Nov. 25, 2016.
Gonzalez, C. R., "Optimal Data Distributions in Machine Learning", California Institute of Technology , pp. 125 (May 22, 2015).
González, C.R., and Abu-Mostafa, Y.S., "Four Results in Matching Data Distributions," pp. 1-18 (Jun. 21, 2014).
González, C.R., and Abu-Mostafa, Y.S., "Mismatched Training and Test Distributions Can Outperform Matched Ones," Neural Computation, vol. 27, No. 2, pp. 365-387 (Feb. 2015).
International Search Report and Written Opinion for International application PCT/US2014/066816, dated Feb. 19, 2015, 14 Pages.
Liu, F., et al., "A Robust Support Vector Data Description Classifier," Proceedings of the 32nd Chinese Control Conference, pp. 3781-3784, (Jul. 26-28, 2013).
Mason, L., et al., "Boosting Algorithms as Gradient Descent," Advances in Neural Information Processing Systems, vol. 12, pp. 512-518 (1999).
Mehrotra, K., et al., "Fault tolerance of Neural Networks," Final Technical Report, RL-TR-94-93, Syracuse University, pp. 107 (Jul. 1994).
Rockafellar, R.T., "Basic Issues in Lagrangian Optimization," Department of Applied Mathematics University of Washington FS-20 Seattle, WA 98195, USA, pp. 25 (1993).
Silva, L, M., et al., "Data classification with multilayer perceptrons using a generalized error function," Neural Networks, vol. 21, Issue 9, pp. 1302-1310 (Nov. 2008).
Sugiyama, M., et al., "Covariate Shift Adaptation by Importance Weighted Cross Validation," Journal of Machine Learning Research, vol. 8, pp. 985-1005 (2007).
Vanck, T., et al., "Using Hyperbolic Cross Approximation to measure and compensate Covariate Shift," Workshop and Conference Proceedings 29, pp. 435-450 (2013).
Extended European Search Report for European Application No. 14863709.3, dated Jul. 6, 2017, pp. 13.
"Cross-validation (statistics)," Wikipedia, accessed at https://web.archive.org/web/20131115062828/https://en.wikipedia.org/wiki/Cross-validation_(statistics), modified on Nov. 14, 2013, pp. 6.
Bickei, S., et al., "Discriminative Learning for Differing Training and Test Distributions," Proceedings of the 24th international conference on Machine learning, pp. 8 (Jul. 24, 2007).
Bickei, S., et al., "Learning under Differing Training and Test Distributions," Dissertation, Universifat Potsdam, pp. 110 (Jul. 22, 2009).
Chiu, H.P., et al., "Learning to generate novel views of objects for class recognition," Computer Vision and Image Understanding, vol. 113, pp. 1183-1197 (2009).
Extended European Search Report for Application No. 14864007.1, dated Jul. 6, 2017, pp. 15.
Extended European Search Report for Application No. 14864908.0, dated Jul. 5, 2017, pp. 5.
Extended European Search Report for Application No. 15761177.3, dated Aug. 30, 2017, pp. 10.
Gretton, A., et al., "Covariate Shift by Kernel Mean Matching," in Dataset Shift in Machine Learning, Chapter 8, pp. 131-160, Quinonero-Candela, J., et al., eds., MIT Press (Dec. 12, 2008).
Guo.,Y., et al., "A Reformulation of Support Vector Machines for General Confidence Functions," Advances in Machine learning, pp. 109-119 (Nov. 2009).
Hachiya., H., et al., "Importance-Weighted Least-Squares Probabilistic Classifier for Covariate Shift Adaptation with Application toHuman Activity Recognition," Neurocomputing, vol. 80, pp. 93-101 (Mar. 15, 2012).
Sakurada, R., et al., "Stock Return Prediction using Messages of the Internet Forum," Department of Computer Science and Engineering. Toyohashi Univmily of Technology, pp. 6 (May 31, 2013) (English Abstract).
Sugiyama, M., et al., "Supervised Learning under Non-Stationarity: when input distribution of data changes," Japan Indutrial Publishing Co., Ltd,vol. 18, No. 10, pp. 1-6 (Oct. 1, 2007) (English Abstract).
Biskup, "Newton's Method and Gradient Descent Method", <www.math.ucla.edu/-biskup/164.2.14f/PDFs/recusions.pdf>, Course Notes for Math 164-2, Fall 2014, Nov. 3, 2014, 4 pp.
Bootkrajang, J., et al., "Boosting in the presence of label noise", <arxiv.org/ftp/arxiv/papers/1309/1309.6818.pdf>, Sep. 26, 2013, 10 pp.
CNOA, First Office Action in Chinese Application No. 2016105348335 dated Apr. 26, 2018 (5 pages).
Extended European Search Report for European Application No. 15761177.3, Search completed Aug. 22, 2017, dated Aug. 30, 2017, 11 pgs.
International Preliminary Report on Patentability for International Application PCT/US2015/015669, Report issued Sep. 13, 2016, dated Sep. 22, 2016, 7 pgs.

* cited by examiner

ALTERNATIVE TRAINING DISTRIBUTION DATA IN MACHINE LEARNING

CROSS-REFERENCE TO RELATED APPLICATIONS

This application is related to U.S. patent application Ser. No. 14/451,859 entitled Weight Benefit Evaluator for Training Data, U.S. patent application Ser. No. 14/451,870 entitled Generation of Weights in Machine Learning, and U.S. patent application Ser. No. 14/451,899 entitled Weight Generation in Machine Learning.

This application claims priority under 35 U.S.C. § 119(e) to U.S. Provisional Application Ser. No. 62/015,218 filed on Jun. 20, 2014 and U.S. Provisional Application Ser. No. 61/950,358 filed on Mar. 10, 2014. The entirety of both of these provisional applications is hereby incorporated by reference.

BACKGROUND

Unless otherwise indicated herein, the materials described in this section are not prior art to the claims in this application and are not admitted to be prior art by inclusion in this section.

In machine learning environments, training data including training inputs and training labels may be used to determine a learned function. The learned function may be effective to indicate a relationship between the training inputs and training labels. The learned function may be deployed in a machine learning system. The machine learning system may receive test inputs and may apply the learned function to the test inputs to produce test labels.

SUMMARY

In some examples, methods in a machine learning environment are generally described. The methods may include, by a computing device, determining a set of datasets in an input space based on training data for a machine learning module. The training data may include training inputs and training labels in the input space. The methods may also include determining a set of out of sample errors based on the training inputs. Each out of sample error may correspond to a respective dataset in the set of datasets. The methods may also include generating alternative distribution data for the machine learning module based on the set of out of sample errors.

In some examples, systems effective to generate alternative distribution data in a machine learning environment are generally described. In some examples, the systems may include a processing module configured to determine a set of datasets in an input space based on training data for a machine learning module. The training data may include training inputs and training labels in the input space. The systems may include an evaluation module configured to be in communication with the processing module. The evaluation module may be configured to determine a set of out of sample errors based on the training inputs. Each out of sample error may correspond to a respective dataset in the set of datasets. The processing module may be further configured to generate the alternative distribution data based on the set of out of sample errors.

In some examples, methods to generate alternative distribution data in a machine learning environment are generally described. The methods may include, by a first device, receiving, from a second device, training data for a machine learning module. The training data may include training inputs and training labels in an input space. The methods may include determining a set of datasets based on the training inputs. The methods may also include receiving test inputs for the machine learning module from the second device. The methods may also include determining a set of out of sample errors based on the training inputs and based on the test inputs. Each out of sample error may correspond to a respective dataset in the set of datasets. The methods may also include generating the alternative distribution data based on the set of out of sample errors.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

Figure 1:
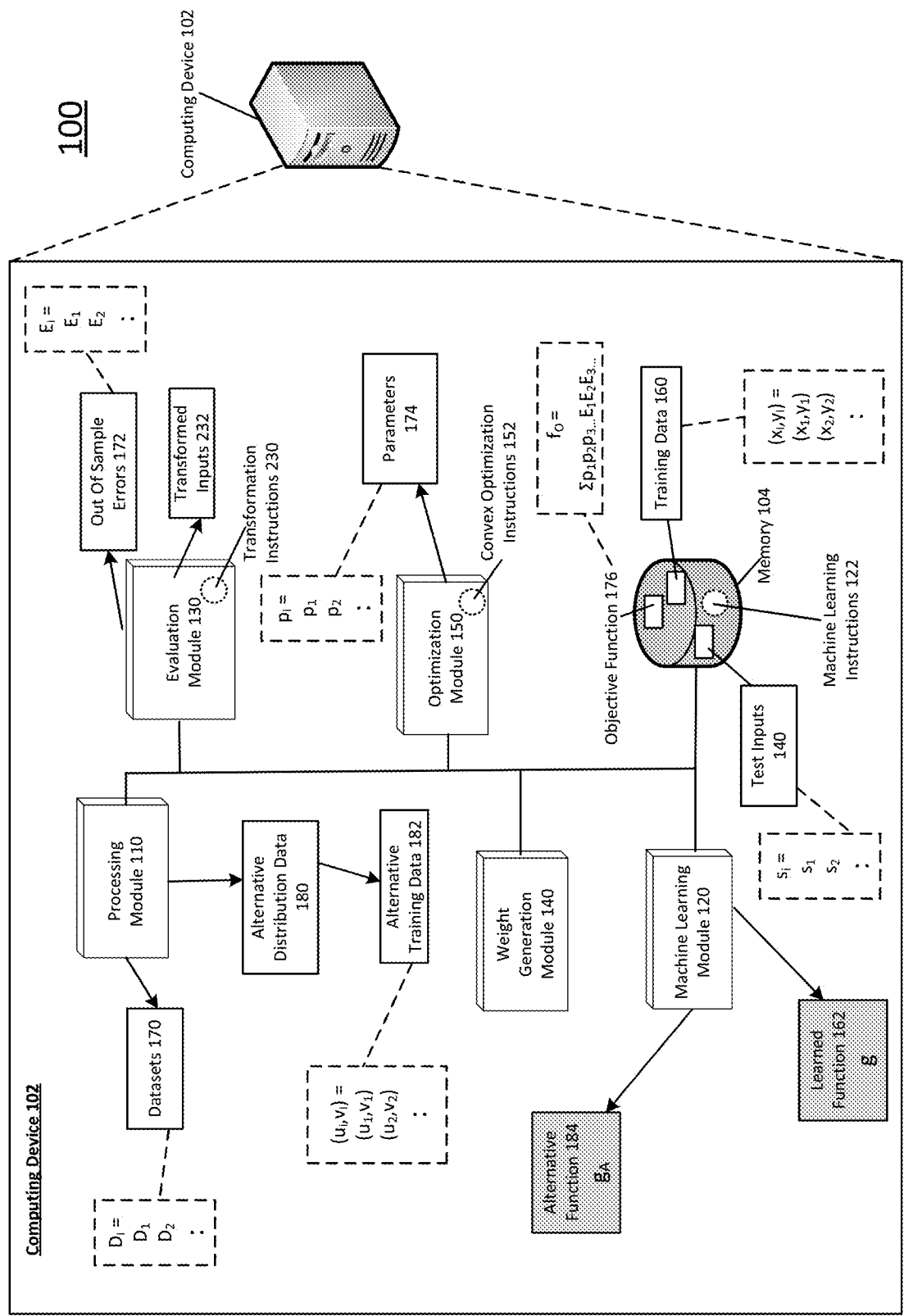
FIG. 1 illustrates an example system that can be utilized to implement alternative training distribution data in machine learning.

all arranged according to at least some embodiments described herein.

DETAILED DESCRIPTION

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

This disclosure is generally drawn, inter alia, to methods, apparatus, systems, devices, and computer program products related to generation of alternative training distribution data in machine learning.

Briefly stated, technologies are generally described for methods and systems to generate alternative training distribution data in a machine learning environment. In some examples, a method may include retrieving, by a device, training data from a memory. The training data may be a set of paired data, where each paired data may include training inputs and training labels. Each training input may be a vector. The training data may be used, for example, by a machine learning module to learn a function. The methods may further include determining, by the device, a set of datasets based on the training inputs. The datasets may represent the possible sets of data in an input space. The methods may further include determining, by the device, a set of out of sample errors based on the training inputs, and based on test data. Each out of sample error may correspond to a respective dataset in the set of datasets. The methods may further include generating, by the device, alternative distribution data based on the set of out of sample errors. The alternative distribution data may be used to determine weights to be applied to the training data. The alternative distribution data may be different from both the training data and test data, where the test data may be used to test a performance of a learned function.

FIG. 1 illustrates an example system 100 that can be utilized to implement alternative training distribution data in machine learning, arranged in accordance with at least some embodiments described herein. As will be described in more detail below, system 100 may be implemented as a machine learning system. System 100 may be implemented to determine a learned function 162 (denoted as g) based on training data 160 (denoted as ($x_i$, $y_i$)). An example learned function may be a function to determine a credit score. Training data 160, in the example, may be sets of data including age, gender, salary and associated credit scores. Training data 160 may be associated with a set of paired data including training inputs ($x_i$) and training labels (denoted as $y_i$). System 100 may be further implemented to generate alternative distribution data 180. Alternative distribution data 180 may be a distribution, such as a probability distribution, of alternative training data 182 (denoted as ($u_i$, $v_i$)). The alternative distribution may be a distribution of input values that are different from both the training distribution and a test distribution (discussed in more detail below). System 100 may be further implemented to determine an alternative function 184 (denoted as $g_A$) based on alternative training data 182, where alternative function 184 may perform at an error rate (for received inputs and generated outputs) lower than an error rate of learned function 162. Alternative function 184 may similarly be a determination of a credit score.

System 100 may be implemented with computing device 102 where computing device 102 may be a computer or a server. Computing device 102 may include a processing module 110, a machine learning module 120, an evaluation module 130, and/or an optimization module 150. In some examples, computing device 102 may further include a weight generation module 140. Processing module 110, machine learning module 120, evaluation module 130, weight generation module 140, and/or optimization module 150 may be configured to be in communication with each other. Computing device 102 may further include a memory 104 configured to be in communication with processing module 110, machine learning module 120, evaluation module 130, and/or optimization module 150. In some examples, each module in computing device 102 may be a hardware component or an embedded system comprising integrated circuits such as FPGA (Field Programmable Gate Array), SoC (System on Chip), etc. In some examples, a first module may be embedded in a second module. For example, optimization module 150 may be embedded on evaluation module 130. In some examples, processing module 110, machine learning module 120, evaluation module 130, and/or optimization module 150 may be components of a processor of computing device 102.

Memory 104 may be configured to store machine learning instructions 122, an objective function 176 (denoted as $f_O$), training data 160, and/or test inputs 140. Machine learning instructions 122 may include instructions effective to facilitate generation of functions such as learned function 162 and/or alternative function 184, etc. Machine learning instructions 122 may further include instructions associated with operations of evaluation module 130, and/or optimization module 150. In some examples, machine learning instructions 122 may be stored in machine learning module 120. Objective function 176 may be a function based on a set of parameters 174 and based on a set of out of sample errors 172 (described below).

As mentioned above, training data 160 may be associated with a set of paired data including training inputs ($x_i$) and training labels ($y_i$). Training inputs ($x_i$) may be a set of vectors, where each vector may correspond to one or more coordinates at a point i. A coordinate may be a dimension of a vector. For example, if learned function 162 relates to generation of a credit score, coordinates may relate to income, salary, etc. Processing module 110 may be configured to determine a set of datasets 170 (denoted by Di) that may be possible in a given input space, where each dataset may be a possible combination of training inputs in training data 160. Test inputs 140 (denoted as s) may be a set of inputs, where each test input may be a vector that corresponds to the one or more coordinates. Test inputs 140 may be used to test an operation of learned function 162. Evaluation module 130 may retrieve test inputs 140 from memory 104. In some examples, test inputs 140 may be received from a device outside of system 100.

Evaluation module 130 may be configured to minimize a set of out of sample errors 172 (denoted as $E_i$) based on training inputs in training data 160 and test inputs 140. Each out of sample error may correspond to a respective dataset among datasets 170. For example, an out of sample error $E_{14}$ may be a sum over all possible errors associated with dataset $D_{14}$. Weight generation module 140 may be configured to generate weights to apply to training data 160 to produce alternative training data 182 (described below). As discussed in more detail below, optimization module 150 may minimize out of sample errors 172 over all possible data sets by determining parameters 174 of objective function 176 such as through the use of convex optimization instructions 152. Parameters 174 may be coefficients which may minimize a value of objective function 176, and each parameter may correspond to a probability of an occurrence of a corresponding dataset in datasets 170.

Processing module 110 may generate alternative distribution data 180 in response to the determination of parameters 174. Processing module 110 may generate alternative training data 182 (denoted as ($u_i$, $v_i$)) based on alternative distribution data 180. In an example, processing module 110 may apply alternative training data 182 to machine learning module 120. Machine learning module 120 may determine alternative function 184 (denoted as $g_A$) based on alternative training data 182. As a result of generation of alternative distribution data 180 based on out of sample errors 172, alternative function 184 may perform at a more desirable error rate (e.g., less out of sample errors) when compared with performance of learned function 162.

Figure 2:
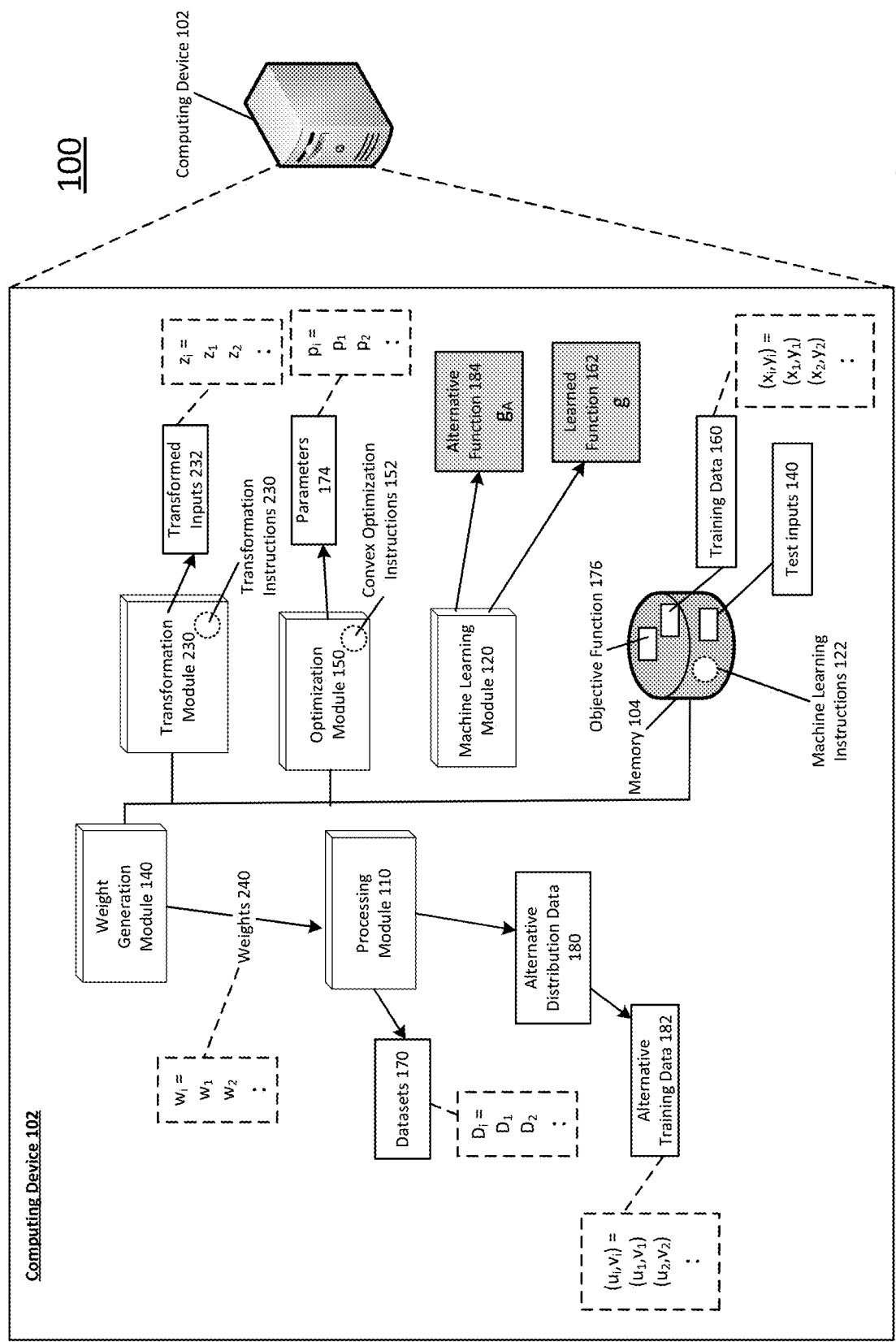
FIG. 2 illustrates the example system of FIG. 1 with additional detail relating to generation of an objective function.

FIG. 2 illustrates example system of 100 FIG. 1 with additional detail relating to alternative training distribution data in machine learning, arranged in accordance with at least some embodiments described herein. FIG. 2 is substantially similar to system 100 of FIG. 1, with additional details. Those components in FIG. 2 that are labeled identically to components of FIG. 1 will not be described again for the purposes of clarity.

In some examples, an input space for training inputs may include potentially continuous values. Processing module 110 may discretize the input space to transform the continuous values into discrete values. Processing module 110 may determine datasets 170 by determining a number of possible combinations of training inputs and outputs in the discrete input space. In an example, if training data 160 includes N points, and a cardinality of the discrete input space corresponds to d, then the total number of data sets may be given by:

$$\sum_{i=1}^{N}\binom{d}{i}$$

Evaluation module 130 may transform training inputs x, to generate transformed inputs $z_i$, based on transformation instructions 230. In an example, transformation instructions 230 may include instructions for evaluation module 130 to transform training inputs $x_i$ using a transformation $\Phi(x_i)=z_i$. Transformation $\Phi$ may be a non-linear transformation, such as $z_i = x_i^2$.

Optimization module 150 may minimize a value of objective function 176. Objective function 176 may be a linear combination of out of sample errors 172 based on parameters 174, such as:

$$\mathbb{E}_{R,x,\epsilon,\theta}[E_{out}(R)] = \sum_{i_1,i_2,\ldots,i_N} p_{i_1} p_{i_2} \cdots p_{i_N} E_{i_1,i_2,\ldots,i_N}$$

Some example machine learning problems may include linear regression, logistic regression, Support Vector Machines, Neural Networks, AdaBoost, etc. In an example, machine learning instructions 122 may relate to a logistic regression problem. Out of sample errors 172 may be determined based on a particular subset of training data 160. In an example estimation of out of sample errors 172, processing module 110 may identify a particular subset of training data 160, such as $\{(x_1,y_1),(x_3,y_3)\}$. Processing module 110 may identify the particular subset of training data 160 randomly. Upon determination of learned function 162 by machine learning module 120, processing module 110 may apply learned function 162 to training inputs $\{x_1, x_3\}$ to generate particular labels. Evaluation module 130 may evaluate the particular labels with training labels $\{y_1, y_3\}$ to estimate out of sample errors 172.

In another example, machine learning instructions 122 may relate to a linear regression problem. When machine learning algorithm 122 relates to a linear regression problem, out of sample errors 172 may be determined based on a closed-form solution of a linear regression problem, such as:

$$\mathbb{E}_{x,\epsilon,\theta}[E_{out}(x, R)] = \sigma_N^2 \sum_{i=1}^{d} z_i^T (Z^T Z)^{-1} z_i P_S(x_i)$$

where $\sigma_N^2$ may be a noise parameter, $z_i$ may be a transformed input (among transformed inputs 232) at point i, Ps($x_i$) may be a distribution of test inputs 140, Z may be a matrix where each row of Z may be a corresponding transform input (among transformed input 232) at point i. For example, row i=1 of Z may be the transformed input $z_1$, row i=2 of Z may be the transformed input $z_2$, etc.

Optimization module 150 may determine parameters 174, such as by executing convex optimization instructions 152 on objective function 176. After determining parameters 174, optimization module 150 may send parameters 174 to processing module 110. Each value of parameters 174 may indicate a probability, for each data set i, that a respective set of input points may occur. In the example above, parameters 174 may correspond to variable p. In an example, each parameter of parameters 174 may correspond to a probability of an input in a particular dataset. For example, parameter $p_{27}=0.25$ may indicate that in data set 2, input 7 has a probability of occurring of 0.25. Processing module 110 may formulate alternative distribution data 180 with use of parameters 174. Processing module 110 may generate alternative training data 182 based on alternative distribution data 180.

In an example to generate alternative training data 182, processing module 110 may receive weights 240 generated by weight generation module 140. In some examples, weight generation module 140 may generate weights 240 based on parameters 174. Weights 240 may be a set of vectors which may be applied, such as by processing module 110, to training data 160. As a result of the application of weights 240 to training data 160, alternative training data 182 may be generated.

Machine learning module 120 may determine alternative function 184 based on alternative training data 182. Alternative function 184 may perform at an error rate which may be better than an error of learned function 162 generated based on training data 160. In some examples, processing module 110, or an additional module of computing device 102, may apply weights to alternative training data 182 to further modify alternative training data 182 before being used by machine learning module 120 to generate alternative function 184.

A system in accordance with the present disclosure may benefit machine learning systems. A system may provide an alternative training data to train the machine learning system. The alternative training data, which may be generated based on minimizing an objective function related to out of sample errors, may cause the machine learning system to learn a function which may perform at a better error rate.

Figure 3:
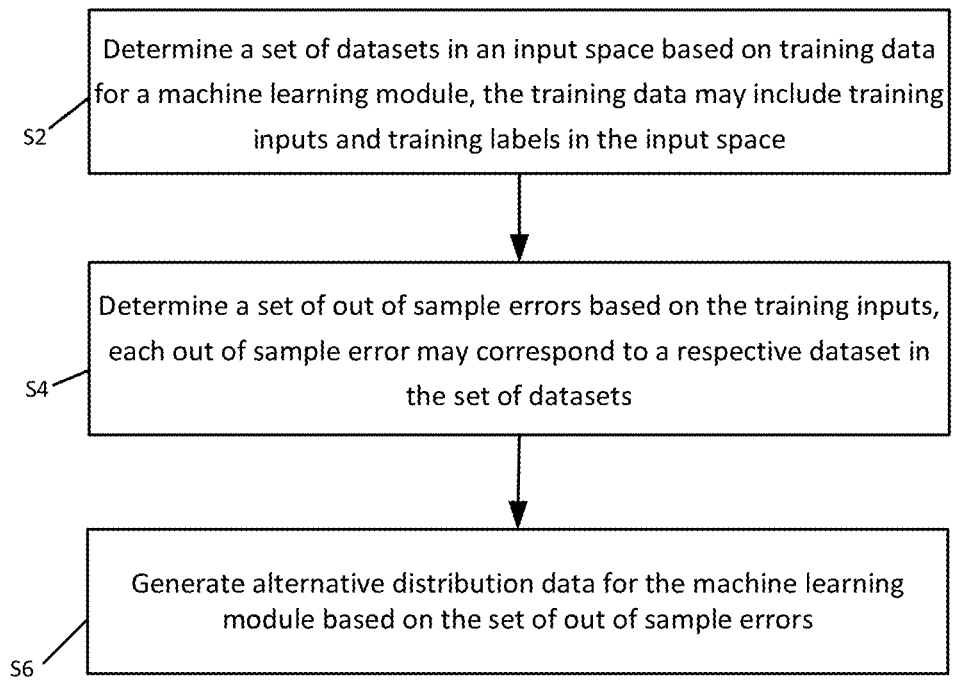
FIG. 3 illustrates a flow diagram for an example process to implement alternative training distribution data in machine learning.

FIG. 3 illustrates a flow diagram for an example process to implement alternative training distribution data in machine learning, arranged in accordance with at least some embodiments presented herein. The process in FIG. 3 could be implemented using, for example, system 100 discussed above. An example process may include one or more operations, actions, or functions as illustrated by one or more of blocks S2, S4, S6, and/or S8. Although illustrated as discrete blocks, various blocks may be divided into additional blocks, combined into fewer blocks, or eliminated, depending on the desired implementation.

Processing may begin at block S2, "Determine a set of datasets in an input space based on training data for a machine learning module, the training data may include training inputs and training labels in the input space". At block S2, a computing device may determine a set of datasets based on training data. The training data may include training inputs and training labels for a machine learning module.

Processing may continue from block S2 to block S4, "Determine a set of out of sample errors based on the training inputs, each out of sample error may correspond to a respective dataset in the set of datasets". At block S4, the computing device may determine a set of out of sample errors based on the training inputs. Each out of sample error may correspond to a respective dataset in the set of datasets. Determination of the set of out of sample errors may include applying a transform to the training inputs to produce transformed inputs. Determination of the set of out of sample errors may further include determining an error function based on the transformed data, and based on the test inputs for the machine learning module. Determination of the set of out of sample errors may further include determining the set of out of sample errors based on the error function.

Processing may continue from block S4 to block S6, "Generate alternative distribution data for the machine learning module based on the set of out of sample errors". At block S8, the computing device may generate alternative distribution data based on the set of out of sample errors. Generation of the alternative distribution data may include determining an objective function based on the set of out of sample errors. Generation of the alternative distribution data may further include determining a set of parameters of the objective function. Generation of the alternative distribution data may further include generating the alternative distribution with use of the set of parameters. In some examples, the computing device may determine the set of parameters of the objective function by applying a convex optimization technique to the objective function.

Figure 4:
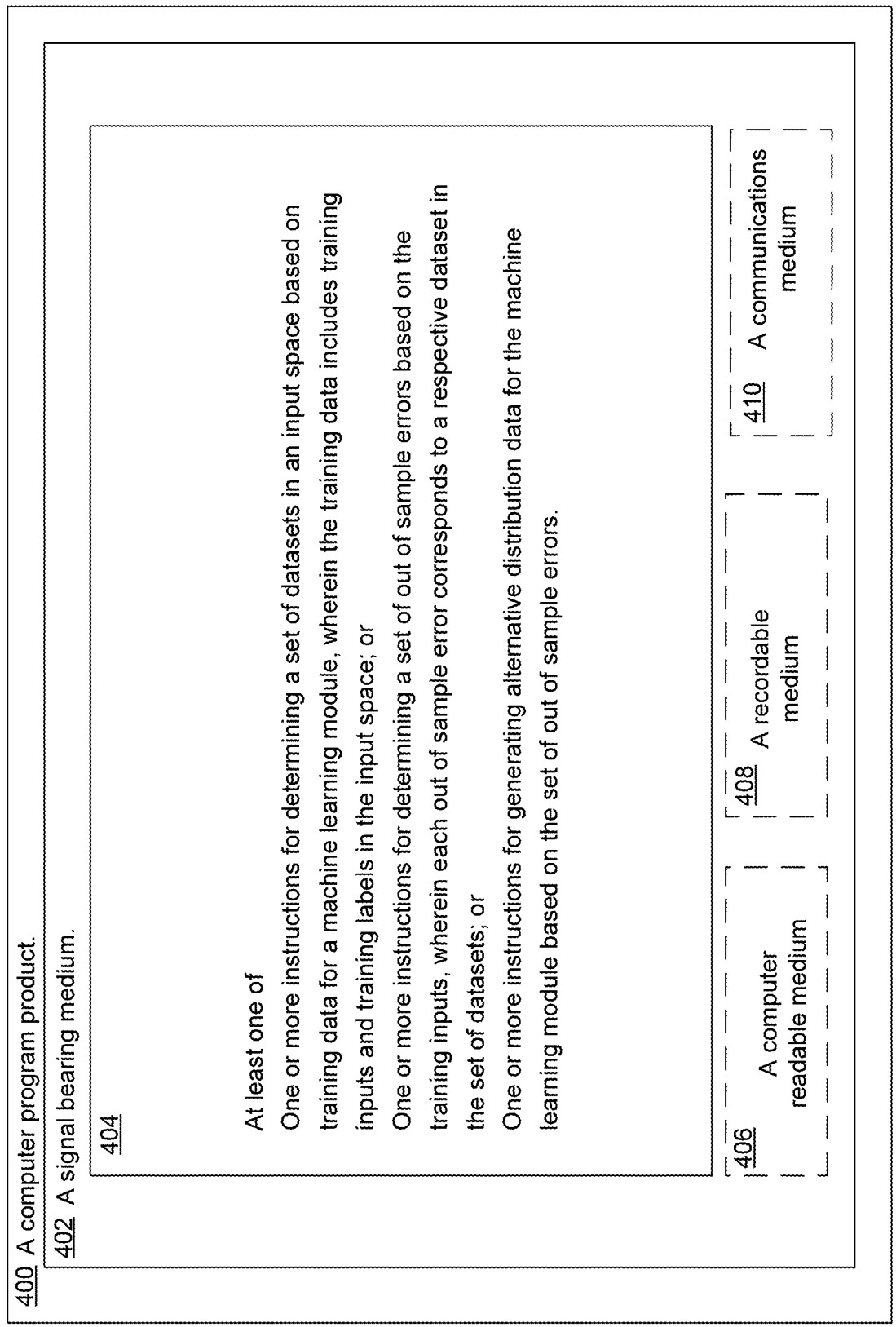
FIG. 4 illustrates an example computer program product that can be utilized to implement alternative training distribution data in machine learning.

FIG. 4 illustrates an example computer program product that can be utilized to implement alternative training distribution data in machine learning, arranged in accordance with at least some embodiments presented herein. Program product 400 may include a signal bearing medium 402. Signal bearing medium 402 may include one or more instructions 404 that, when executed by, for example, a processor, may provide the functionality described above with respect to FIGS. 1-3. Thus, for example, referring to system 100, computing device 102 may undertake one or more of the blocks shown in FIG. 4 in response to instructions 404 conveyed to the system 100 by medium 402.

In some implementations, signal bearing medium 402 may encompass a computer-readable medium 406, such as, but not limited to, a hard disk drive, a Compact Disc (CD), a Digital Versatile Disk (DVD), a digital tape, memory, etc. In some implementations, signal bearing medium 402 may encompass a recordable medium 408, such as, but not limited to, memory, read/write (R/W) CDs, R/W DVDs, etc. In some implementations, signal bearing medium 402 may encompass a communications medium 410, such as, but not limited to, a digital and/or an analog communication medium (e.g., a fiber optic cable, a waveguide, a wired communications link, a wireless communication link, etc.). Thus, for example, program product 400 may be conveyed to one or more modules of the system 100 by an RF signal bearing medium 402, where the signal bearing medium 402 is conveyed by a wireless communications medium 410 (e.g., a wireless communications medium conforming with the IEEE 802.11 standard).

Figure 5:
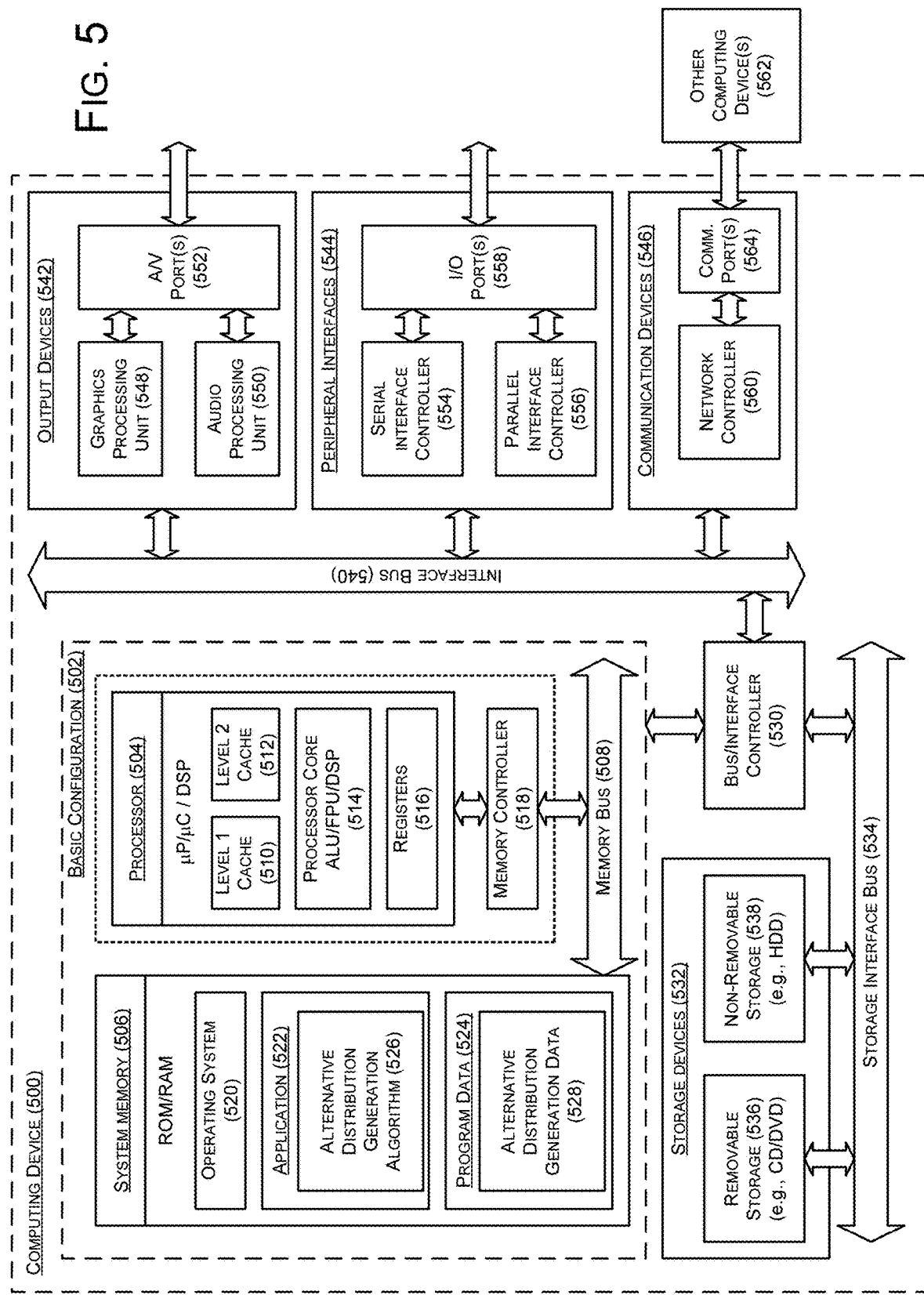
FIG. 5 is a block diagram illustrating an example computing device that is arranged to implement alternative training distribution data in machine learning.

FIG. 5 is a block diagram illustrating an example computing device that is arranged to implement alternative training distribution data in machine learning, arranged in accordance with at least some embodiments presented herein. In a very basic configuration 502, computing device 500 typically includes one or more processors 504 and a system memory 506. A memory bus 508 may be used for communicating between processor 504 and system memory 506.

Depending on the desired configuration, processor 504 may be of any type including but not limited to a microprocessor (µP), a microcontroller (µC), a digital signal processor (DSP), or any combination thereof Processor 504 may include one more levels of caching, such as a level one cache 510 and a level two cache 512, a processor core 514, and registers 516. An example processor core 514 may include an arithmetic logic unit (ALU), a floating point unit (FPU), a digital signal processing core (DSP Core), or any combination thereof An example memory controller 518 may also be used with processor 504, or in some implementations memory controller 518 may be an internal part of processor 504.

Depending on the desired configuration, system memory 506 may be of any type including but not limited to volatile memory (such as RAM), non-volatile memory (such as ROM, flash memory, etc.) or any combination thereof System memory 506 may include an operating system 520, one or more applications 522, and program data 524. Application 522 may include an alternative distribution generation algorithm 526 that is arranged to perform the functions as described herein including those described previously with respect to FIGS. 1-4. Program data 524 may include alternative distribution generation data 528 that may be useful for alternative distribution training data in machine learning as is described herein. In some embodiments, application 522 may be arranged to operate with program data 524 on operating system 520 such that alternative distribution training data in machine learning may be provided. This described basic configuration 502 is illustrated in FIG. 5 by those components within the inner dashed line.

Computing device 500 may have additional features or functionality, and additional interfaces to facilitate communications between basic configuration 502 and any required devices and interfaces. For example, a bus/interface controller 530 may be used to facilitate communications between basic configuration 502 and one or more data storage devices 532 via a storage interface bus 534. Data storage devices 532 may be removable storage devices 536, non-removable storage devices 538, or a combination thereof Examples of removable storage and non-removable storage devices include magnetic disk devices such as flexible disk drives and hard-disk drives (HDD), optical disk drives such as compact disc (CD) drives or digital versatile disk (DVD) drives, solid state drives (SSD), and tape drives to name a few. Example computer storage media may include volatile and nonvolatile, removable and non-removable media implemented in any method or technology for storage of information, such as computer readable instructions, data structures, program modules, or other data.

System memory 506, removable storage devices 536 and non-removable storage devices 538 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computing device 500. Any such computer storage media may be part of computing device 500.

Computing device 500 may also include an interface bus 540 for facilitating communication from various interface devices (e.g., output devices 542, peripheral interfaces 544, and communication devices 546) to basic configuration 502 via bus/interface controller 530. Example output devices 542 include a graphics processing unit 548 and an audio processing unit 550, which may be configured to communicate to various external devices such as a display or speakers via one or more AN ports 552. Example peripheral interfaces 544 include a serial interface controller 554 or a parallel interface controller 556, which may be configured to communicate with external devices such as input devices (e.g., keyboard, mouse, pen, voice input device, touch input device, etc.) or other peripheral devices (e.g., printer, scanner, etc.) via one or more I/O ports 558. An example communication device 546 includes a network controller 560, which may be arranged to facilitate communications with one or more other computing devices 562 over a network communication link via one or more communication ports 564.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computing device 500 may be implemented as a portion of a small-form factor portable (or mobile) electronic device such as a cell phone, a personal data assistant (PDA), a personal media player device, a wireless web-watch device, a personal headset device, an application specific device, or a hybrid device that include any of the above functions. Computing device 500 may also be implemented as a personal computer including both laptop computer and non-laptop computer configurations.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method in a machine learning environment, the method comprising:
   determining, by a processor of a computing device based on training data for a machine learning module, a set of possible datasets in an input space, wherein:
   the set of possible datasets comprises a set of all $$\sum_{i=1}^{N}\binom{d}{i}$$

possible datasets of N input points in the training data in a discrete input space of cardinality d;
   the training data comprises training inputs and training labels in the input space,
   each dataset of the set of possible datasets is a combination of at least two training inputs among the training inputs, and
   the training data is associated with a learned function that corresponds to a first error rate;
   receiving, by the processor, test data that comprises test inputs to evaluate a performance of the learned function associated with the training data;
   determining, by an evaluation module of the computing device based on the training inputs and the test inputs, a set of out of sample errors, wherein each out of sample error corresponds to a respective dataset of the set of possible datasets;
   generating, by the processor of the computing device based on the set of out of sample errors, alternative distribution data for the machine learning module, wherein generating the alternative distribution data includes:
   determining an objective function based on the set of out of sample errors;
   determining a set of parameters of the objective function to minimize the set of out of sample errors from the set of possible datasets, wherein each parameter of the set of parameters corresponds to a probability that a particular training input of the training inputs occurs in a corresponding dataset of the set of possible datasets; and
   generating the alternative distribution data by use of the set of parameters and the minimized set of out of sample errors, wherein the alternative distribution data is different from both the training data and the test data;
   generating, by the machine learning module, an alternative function based on the alternative distribution data, wherein the alternative function corresponds to a second error rate that is lower than the first error rate that corresponds to the learned function associated with the training data; and
   operating a machine learning system in accordance with the alternative function, wherein the machine learning system performs at a lower error rate using the alternative function corresponding to the alternative distribution data than the machine learning system based on the learned function corresponding to the training data alone.

2. The method of claim 1, wherein determining the set of parameters of the objective function comprises applying a convex optimization technique to the objective function.

3. The method of claim 1, wherein determining the set of parameters includes determining parameters that reduce a value of the objective function.

4. The method of claim 1, further comprising generating weights for the training data based on the alternative distribution data.

5. The method of claim 1, wherein determining the set of out of sample errors comprises:
   applying a transform to the training inputs to produce transformed inputs;
   determining an error function based on the transformed inputs and based on test inputs for the machine learning module; and
   determining the set of out of sample errors based on the error function.

6. The method of claim 5, wherein determining the error function includes combining a noise parameter with the transformed inputs and the test inputs to determine the error function.

7. A non-transitory computer-readable medium that includes computer-executable instructions stored thereon that are executable by the computing device of claim 1 to perform the method of claim 1.

8. The method of claim 1, wherein a number of datasets in the input space is calculated using:

$$\sum_{i=1}^{N}\binom{d}{i},$$

wherein N represents all points in the training data and d represents a cardinality of the input space.

9. A system effective to generate alternative distribution data in a machine learning environment, the system comprising:
   a machine learning circuit;
   a processor configured to be in communication with the machine learning circuit and further configured to determine, based on training data for the machine learning circuit, a set of possible datasets in an input space, wherein:
   the set of possible datasets comprises a set of all $$\sum_{i=1}^{N}\binom{d}{i}$$

possible datasets of N input points in the training data in a discrete input space of cardinality d;

the training data comprises training inputs and training labels in the input space, each dataset of the set of possible datasets is a combination of at least two training inputs among the training inputs, and the training data is associated with a learned function that corresponds to a first error rate;

the processor is further configured to receive test data, wherein the test data comprises test inputs to evaluate a performance of the learned function associated with the training data;

an evaluation circuit configured to be in communication with the processor, wherein:

the evaluation circuit is further configured to determine, based on the training inputs and the test inputs, a set of out of sample errors, each out of sample error corresponds to a respective dataset of the set of possible datasets, and the processor is further configured to generate, based on the set of out of sample errors, the alternative distribution data, wherein the alternative distribution data is different from both the training data and the test data; and an optimization circuit configured to be in communication with the processor and the evaluation circuit, wherein the optimization circuit is further configured to:

determine an objective function based on the set of out of sample errors;

determine a set of parameters of the objective function to minimize the set of out of sample errors from the set of possible datasets, wherein each parameter of the set of parameters corresponds to a probability that a particular training input of the training inputs occurs in a corresponding dataset of the set of possible datasets; and send the set of parameters to the processor, wherein:

the processor is configured to generate, based on the minimized set of out of sample errors and with use of the set of parameters, the alternative distribution data, the machine learning circuit is configured to generate an alternative function based on the alternative distribution data, the alternative function corresponds to a second error rate that is lower than the first error rate that corresponds to the learned function associated with the training data; and the system is configured to operate in accordance with the alternative function, wherein the system performs at a lower error rate using the alternative function corresponding to the alternative distribution data than the system based on the learned function corresponding to the training data alone.

10. The system of claim 9, wherein the optimization circuit is configured to apply a convex optimization technique to the objective function to determine the set of parameters.

11. The system of claim 9, wherein the set of parameters includes parameters that reduce a value of the objective function.

12. The system of claim 9, wherein the processor is further configured to generate weights for the training data based on the alternative distribution data.

13. The system of claim 9, wherein to determine the set of out of sample errors, the evaluation circuit is configured to:

apply a transform to the training inputs to produce transformed inputs;

determine an error function based on the transformed inputs and based on test inputs for the machine learning circuit; and determine the set of out of sample errors based on the error function.

14. The system of claim 13, wherein the error function comprises a noise parameter.

15. The system of claim 9, wherein a number of datasets in the input space is calculated by use of:

$$\sum_{i=1}^{N} \binom{d}{i}.$$

wherein N represents all points in the training data and d represents a cardinality of the input space.

16. A method to generate alternative distribution data in a machine learning environment, the method comprising:

receiving, by a first device from a second device, training data for a machine learning module, wherein:

the training data comprises training inputs and training labels in an input space, and the training data is associated with a learned function that corresponds to a first error rate;

determining, by a processor of the first device based on the training inputs, a set of possible datasets, wherein the set of possible datasets comprises a set of all $$\sum_{i=1}^{N} \binom{d}{i}$$

possible datasets of N input points in the training data in a discrete input space of cardinality d and wherein each dataset of the set of possible datasets is a combination of at least two training inputs among the training inputs;

receiving, by the first device from the second device, test data that comprises test inputs for the machine learning module;

determining, by an evaluation module of the first device based on the training inputs and on the test inputs, a set of out of sample errors, wherein each out of sample error corresponds to a respective dataset of the set of possible datasets;

generating, by the processor of the first device based on the set of out of sample errors, the alternative distribution data, wherein generating the alternative distribution data includes:

determining an objective function based on the set of out of sample errors;

determining a set of parameters of the objective function to minimize the set of out of sample errors from the set of possible datasets, wherein each parameter of the set of parameters corresponds to a probability that a particular training input of the training inputs occurs in a corresponding dataset of the set of possible datasets; and generating the alternative distribution data by use of the set of parameters and the minimized set of out of sample errors, wherein the alternative distribution data is different from both the training data and the test data;

generating, by the machine learning module, an alternative function based on the alternative distribution data, wherein the alternative function corresponds to a second error rate that is lower than the first error rate that corresponds to the learned function associated with the training data; and operating the first device in accordance with the alternative function, wherein the first device operates at a lower error rate using the alternative function corresponding to the alternative distribution data than the first device based on the learned function corresponding to the training data alone.

17. The method of claim 16, wherein determining the set of parameters comprises applying a convex optimization technique to the objective function.

18. The method of claim 16, wherein determining the set of parameters includes determining parameters that reduce a value of the objective function.

19. The method of claim 16, further comprising generating weights for the training data based on the alternative distribution data.

20. The method of claim 16, wherein determining the set of out of sample errors comprises:

applying a transform to the training inputs to produce transformed inputs;

determining an error function based on the transformed inputs and based on the test inputs; and determining the set of out of sample errors based on the error function.

21. The method of claim 16, wherein a number of datasets is calculated using:

$$\sum_{i=1}^{N}\binom{d}{i},$$

wherein N represents all points in the training data and d represents a cardinality of the input space.

* * * * *